United States Patent [19]
Fong

[11] Patent Number: 6,085,066
[45] Date of Patent: Jul. 4, 2000

[54] NON-VIDEO PATH DATA COLLECTION DEVICE

[75] Inventor: William T. J. Fong, San Diego, Calif.

[73] Assignee: ADcom Information Services Inc., Carlsbad, Calif.

[21] Appl. No.: 09/237,524

[22] Filed: Jan. 27, 1999

Related U.S. Application Data

[62] Division of application No. 08/540,710, Oct. 11, 1995, Pat. No. 5,881,360.

[51] Int. Cl.[7] .................................................. H04N 7/16
[52] U.S. Cl. ....................................... 455/2; 348/1
[58] Field of Search .................... 348/1, 2, 4, 5, 348/6, 7, 8, 9, 10, 11, 12; 455/2, 6.1, 6.2, 6.3, 5.1, 4.1, 3.1, 9; H04N 7/16, 7/173

[56] References Cited

U.S. PATENT DOCUMENTS

| | | | |
|---|---|---|---|
| 3,803,349 | 4/1974 | Watanabe | 358/84 |
| 3,919,479 | 11/1975 | Moon et al. | 179/1 SB |
| 4,718,406 | 1/1988 | Weinblatt | 455/2 |
| 5,023,929 | 6/1991 | Call | 455/2 |
| 5,594,934 | 1/1997 | Lu et al. | 348/1 |

FOREIGN PATENT DOCUMENTS

| | | |
|---|---|---|
| 064847 | 11/1982 | European Pat. Off. . |
| 2555383 A1 | 11/1983 | France . |
| 71019317 | 11/1983 | France . |

*Primary Examiner*—Chris Grant
*Attorney, Agent, or Firm*—Woodcock Washburn Kurtz Mackiewicz & Norris LLP

[57] ABSTRACT

A system performs audio matching to determine the channel to which a television set is tuned. In one embodiment, the system feeds two audio signals to primary and secondary windings of an audio transformer, and employs an output signal taken from a center tap on the primary winding to determine whether the audio signals match. In another embodiment, the system detects transitions of the two audio signals, produces a pulse for each transition, and compares the pulses to determine whether the signals match.

6 Claims, 4 Drawing Sheets

TVs WITH DIRECT CABLE LINE IN:

TVs WITH SET-TOP CONVERTERS:

TVs WITH VCRs AND SET-TOPS:

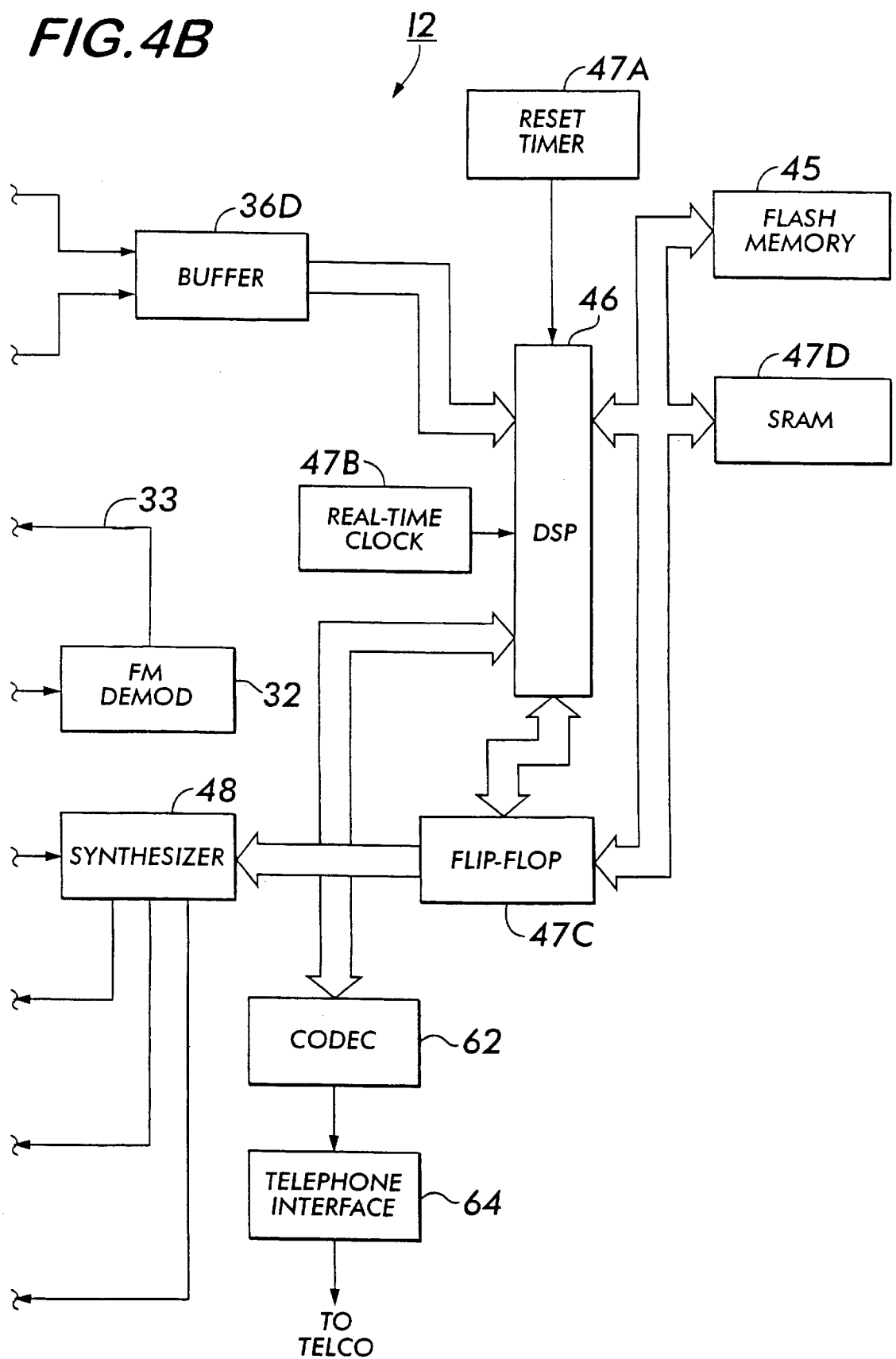

NON-VIDEO PATH DATA COLLECTION DEVICE

RELATED APPLICATIONS

This application is a divisional of U.S. Patent Application Ser. No. 08/540,710 filed Oct. 11, 1995 now U.S. Pat. No. 5,881,360.

FIELD OF THE INVENTION

The present invention relates generally to broadcast station audience monitoring systems, and more particularly to methods and apparatus for monitoring televisions to determine which channel is being viewed. The invention is particularly suited for use in making statistical analyses of the audiences of different transmitting stations. A presently preferred embodiment of the invention is especially suited for use with televisions receiving CATV signals.

BACKGROUND OF THE INVENTION

The audience monitoring procedures currently used to calculate the size of a television and/or radio audience, which determines the price broadcasters can charge for advertising time, have come under growing criticism in recent years. The audience monitoring procedures typically depend on responses made by individuals who have agreed to be part of a sample audience. To calculate television ratings, for example, viewers are asked to log their time by pressing buttons on a "people meter" attached to their television sets. This method has come under attack by network executives who argue that many of these people simply fail to use the meters. Radio ratings are derived primarily from listeners' diaries, or written logs, and telephone surveys. Television stations could, of course, employ written logs or telephone surveys. However, written logs require even more discipline from listeners than electronic logs, and telephone surveys are vulnerable to faulty memories.

U.S. Pat. No. 4,955,070 (Welsh) describes a device that automatically identifies the station tuned in by a listener and logs the amount of time the listener remains within earshot. The device is based on "acoustic matching," and includes as its key components a microphone, a radio tuner and a micro-processor. The microphone detects sound near the person being monitored, and the microprocessor converts this sound into a digital code. The device then compares this code with a code similarly-derived from radio stations electronically monitored by the tuner. When the codes from the microphone and the tuner "match," the device logs the station and the amount of time the match continues. An important feature of this device is that, to determine whether there is a match, the respective signals being compared are first autocorrelated to determine two sets of correlation coefficients and then the two sets of correlation coefficients are compared. A disadvantage of the autocorrelation technique is that the correlation coefficients will be modified if the user distorts the frequency spectrum of the broadcast signal, e.g., by amplifying or suppressing selected frequency components.

French Patent No. 2,555,383 (Barrault) describes a similar audience monitoring system, i.e., one that digitalizes the respective signals being compared and then compares the resulting digital signals by way of a statistical correlation technique.

U.S. Pat. No. 4,388,644 (Ishman et al.), entitled "Apparatus for Monitoring a Multichannel Receiver," discloses a channel-monitoring system that includes means for injecting a signal into the antenna input of the receiver being monitored and means for detecting the injected signal at the output of the receiver. The monitor is capable of detecting the channel to which the receiver is tuned by varying the frequency of the injected signal over a prescribed set of frequencies that correspond to the channels to which the receiver may be tuned.

Thus, both the Welsh and Barrault techniques involve sophisticated digital signal processing to determine whether the respective signals match. The Ishman system requires a modification of the input signal of the receiver being monitored, which is believed to be too complex and expensive to be practical. A primary goal of the present invention is to provide an audience monitoring system that is simpler and more reliable than the known systems.

SUMMARY OF THE INVENTION

The present invention provides a method and system for determining the channel to which a television is tuned. In one presently preferred embodiment of the invention, this determination is made by receiving a television signal receivable by a television and demodulating the television signal to obtain a first audio signal, and obtaining a second audio signal representative of sound generated by the television as a result of being tuned to one of a prescribed set of channels. A match signal is generated on the basis of the first and second audio signals, wherein the match signal indicates whether the first and second audio signals are from the same television channel. The match signal is preferably generated by an audio transformer. For example, in the preferred embodiment, the first audio signal is fed to one of a primary winding or secondary winding of the transformer, the second audio signal is fed to the other of the primary winding or secondary winding, and the match signal is provided on a center tap of the primary winding. In the preferred embodiment, the first audio signal is phase shifted and rectified prior to being fed to the transformer.

An alternative embodiment of the invention includes the steps of, or means for: (a) receiving a television signal and demodulating the television signal to obtain a first audio signal, the first audio signal being characterized by a first series of zero crossings; (b) generating a second audio signal on the basis of a signal or sound generated by the television, the second audio signal being characterized by a second series of zero crossings; (c) generating a first series of pulses, wherein each pulse in the first series corresponds to a zero crossing of the first audio signal; (d) generating a second series of pulses, wherein each pulse of the second series corresponds to a zero crossing of the second audio signal; and (e) generating a match signal on the basis of the first and second series of pulses, the match signal indicating that the first and second audio signals are from the same television channel. A presently preferred form of the alternative embodiment receives a television signal on a known channel; increments a counter each time pulses from the first and second series of pulses occur simultaneously, and indicates a match when the count value is above a preset threshold; periodically resets the count value; and changes the channel from which the television signal is received if a match is not detected after a prescribed period.

According to another aspect of the invention, a cable television audience monitoring system comprises: a television, a Non-Video Path Unit (NVPU) data collection device for determining the channel to which the television is tuned, and a coupler for feeding an input CATV signal to the television and the NVPU.

Other features of the invention are disclosed below.

BRIEF DESCRIPTION OF THE DRAWINGS

FIG. 4A and 4B depicts is a block diagram of a presently preferred embodiment of a Non-Video Path Unit (NVPU) data collection device in accordance with the present invention.

DETAILED DESCRIPTION OF PREFERRED EMBODIMENTS

Figure 1:
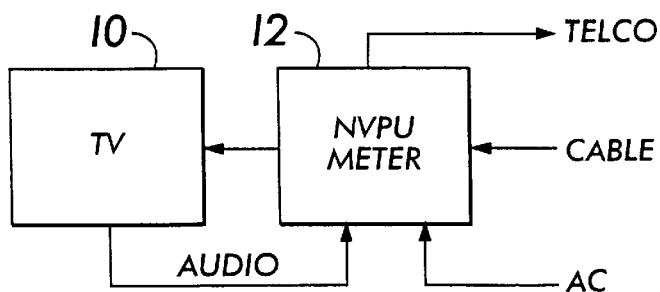
FIGS. 1–3 are block diagrams of alternative configurations of a television metering system in accordance with the present invention.
Figure 2:
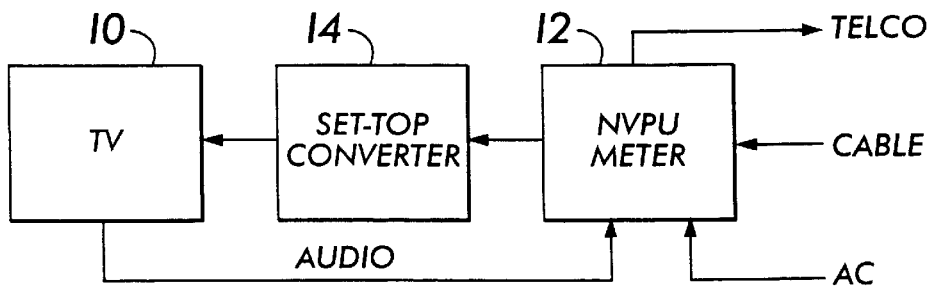
Figure 3:
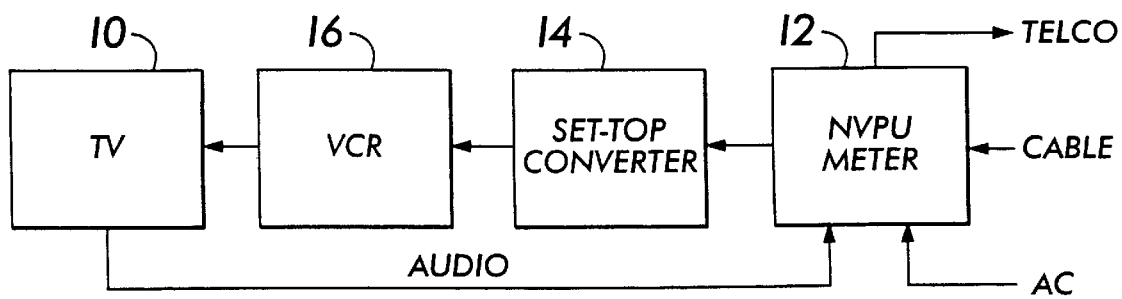

The Non-Video Path Unit (NVPU) 12 is a device which monitors the channel being viewed by a cable television viewer. The NVPU 12 performs audio matching and can be used on a variety of television viewing systems, including but not limited to (1) a television 10 with a direct cable input line, as in FIG. 1; (2) a television with a set-top converter 14 (i.e., a decoder box), as in FIG. 2; and (3) a television with a VCR 16 and a set top converter 14, as in FIG. 3. The NVPU 12 can also be used on other television viewing systems, including those receiving signals from a satellite (not shown).

In one presently preferred embodiment, the outer case (not shown) of the NVPU 12 is plastic with metallic paint to reduce signal radiation and interference. In this embodiment, the NVPU 12 includes two printed circuit (PC) boards, including (1) a digital board, or communications module, and (2) an analog board, also called the "audio matching" module. The two boards are connected by a connector.

The communications module includes a digital signal processor (DSP) controller (item 46 in FIG. 4B); a flash memory EPROM (item 45 in FIG. 4B); a modem (not shown); a real time clock connected to a battery (not shown); and a voltage regulator (not shown), which converts 12 V AC to ±5 and ±12 V DC. The voltage regulator on the digital board provides all the DC voltage for the audio matching module. A "Telco" output signal (provided via a telephone interface) is available for remotely interrogating the NVPU's stored data. The telephone interface can also be employed to provide a telephone number and time (used, e.g., in sending the NVPU's stored data), receive time and reset the on-board clock (discussed below), and receive uploaded software.

Figure 4A:
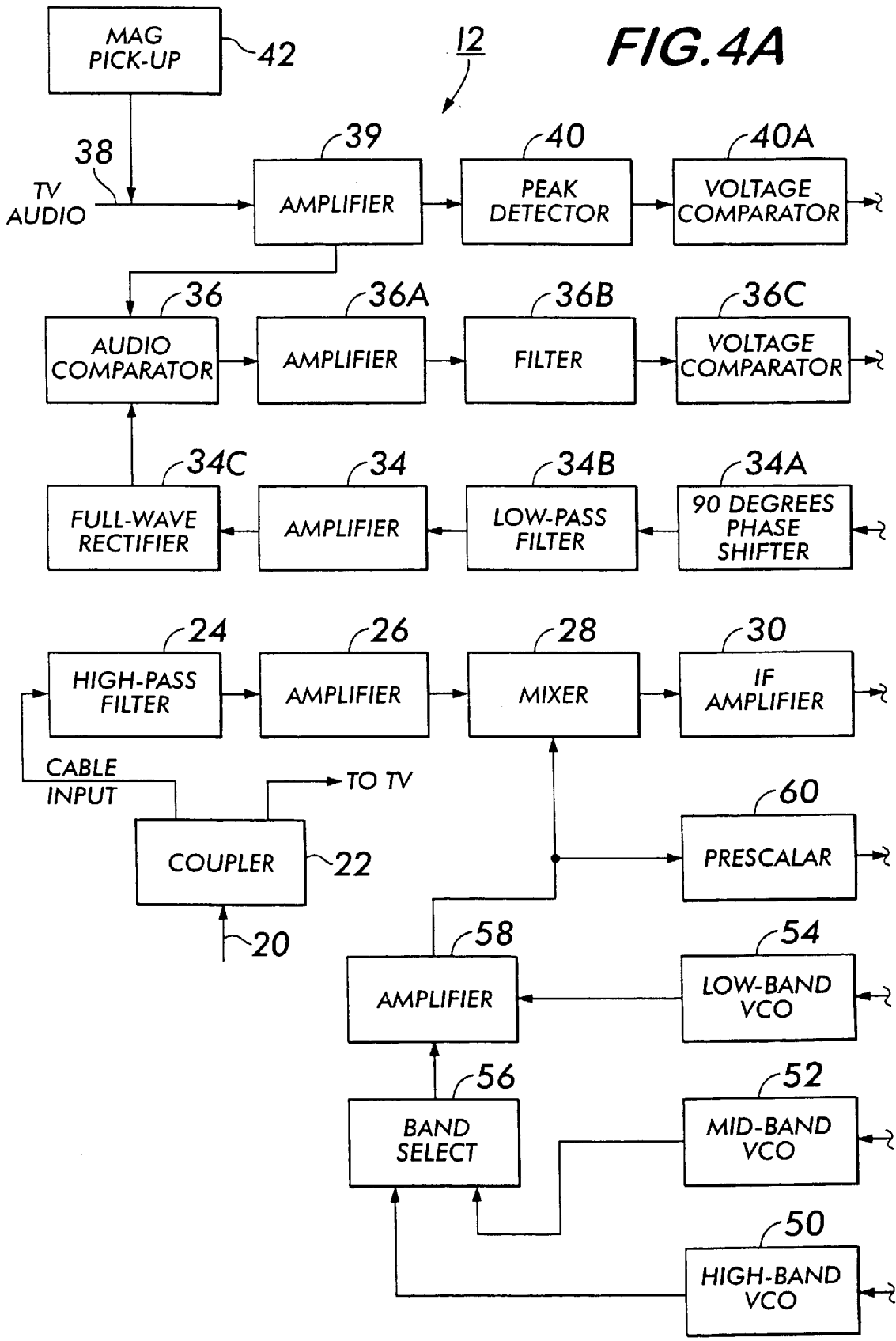

FIG. 4A and 4B depicts is a block diagram of one presently preferred embodiment of the NVPU 12. As shown, the broadband cable signal to the television set (or the cable converter or decoder box) enters through a coaxial cable 20 and is passed through a coupler 22 to the NVPU 12. The coupler has low loss and a wideband frequency response that covers the full cable channel spectrum, and provides the entire broadband cable signal to the NVPU's channel detection circuitry. This circuitry includes a high pass filter 24 that removes out-of-band signals below channel 2; an amplifier 26 (50–450 MHz); a mixer 28 (3.25 MHz output); an IF amplifier 30; and an FM demodulator 32, which outputs an audio signal 33. The audio signal 33 is fed sequentially to a 90° phase shifter 34A, lowpass filter 34B, amplifier 34, full-wave rectifier 34C, and an audio comparator 36. The output of the audio comparator is fed to an amplifier 36A, filter 36B, voltage comparator 36C, and then to a buffer 36D. The NVPU 12 also includes an input 38 for receiving audio from an audio output of a TV; a peak detector 40 and voltage comparator 40A; an optional magnetic pickup 42, which can be used instead of the direct audio from the TV; a DSP controller 46 coupled to a reset timer 47A, clock 47B, flip-flop 47C, and memory (SRAM) 47D; a synthesizer 48; a set of voltage controlled oscillators (VCOs) 50, 52, 54; a band select switch 56; another amplifier 58; a prescalar unit 60; a codec (coder/decoder) 62, and a telephone interface 64.

The VCOs 50, 52, 54 generate signals between 248 MHz and 496 MHz. The hi-band signal is between 248 MHz and 453.25 MHz, and is generated by VCO 50. The mid-band signal is between 124 MHz and 248 MHz, and is generated by VCO 52. VCO 54 generates a lo-band signal between 53.25 MHz and 130 MHz. The band select switch 56 selects an output of the VCOs and is controlled by the DSP 46 (although the connection between the DSP and synthesizer is not shown). The selected 53.25–453.25 MHz signal is then mixed by the mixer 28 with the incoming audio subcarrier received via the cable input. The output of the mixer 28 is a 3.25 MHz audio subcarrier. The 3.25 MHz audio subcarrier is amplified and demodulated, and the audio baseband is recovered and output on line 33 to the phase shifter 34A. The audio baseband signal on line 33, demodulated from the 3.25 MHz audio subcarrier as described above, is phase shifted by 90° by phase shifter 34A, filtered by lowpass filter 34B, amplified by amplifier 34, full-wave rectified by rectifier 34C, and input to audio comparator 36. Another audio baseband signal from the television 10 (FIGS. 1–3) is obtained from the audio cable connected to the television's audio output jack. Alternatively, if there is no output jack, this other audio signal is obtained from the magnetic pick-up coil 42 placed near the television's speaker (not shown). The magnetic pick-up 42 is designed not to detect conversation and audio noise not emanating from the television. The audio signal is generated by the magnetic pick-up coil on the basis of the magnetic flux generated by the speaker of the television set. This audio signal is fed to amplifier 39 and then into audio comparator 36. The amplifier 39, peak detector 40, voltage comparator 40A, and buffer 36D are employed to determine whether the television set is turned on and emitting sound. The voltage comparator 40A compares the voltage from the peak detector 40 with a pre-set DC voltage, which allows the system to account for ambient noise that may be present.

The two audio baseband signals (i.e., the audio signal from the cable and the audio signal from the TV) are compared in audio comparator 36 to determine whether they match. In the presently preferred embodiment, the audio comparator 36 is an audio transformer comprising a center-tapped primary winding connected to receive the rectified audio signal from the demodulator, and a secondary winding connected to receive the audio signal from the television set. The other side of the secondary winding is grounded. An output signal is taken from the center tap of the primary winding. This output signal is a rectified (DC) audio signal when the audio signal from the cable and the audio signal from the TV are matched (in phase). The center tap of the primary winding provides an unrectified (AC) signal when the two audio signals are not matched. The output signal of the audio comparator 36 is amplified by amplifier 36A and fed into an RC network (filter 36B) that provides a DC output signal at a level linearly related to the audio output level of the television set. The voltage comparator 36C compares the signal output of filter 36B with a pre-set voltage level, thus permitting the system to account for ambient noise.

The prescalar unit 60 divides the signal output by amplifier 58 (e.g., by 128, 256, etc.) and feeds the divided signal back to the synthesizer 48, as a feedback signal for use in accurately synthesizing frequency signals for the VCOs 50, 52, 54. The flip-flop 47C latches command signals from the DSP 46 instructing the synthesizer 48 to tune to a specified frequency.

Those skilled in the art will recognize that many modifications can be made to the preferred embodiment without departing from the true scope of the present invention. For example, the present invention can be practiced by detecting transitions of the two audio signals, producing a pulse for each transition, and comparing the pulses to determine whether the signals match. This embodiment is depicted in FIG. 5 and described next.

Figure 5:
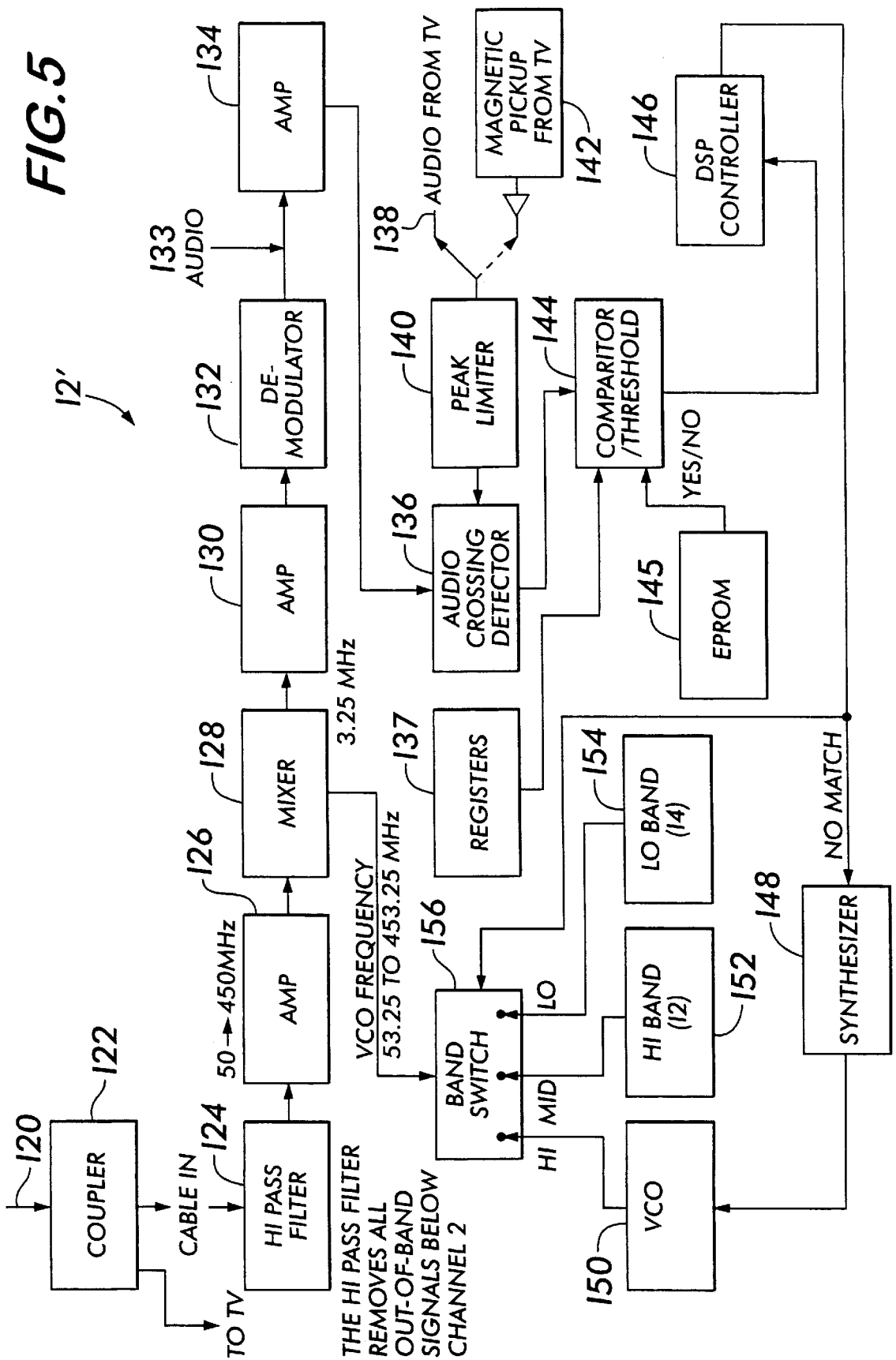
FIG. 5 is a block diagram of an alternative embodiment of the NVPU device.

As shown in FIG. 5, the broadband cable signal to the television set (or the cable converter or decoder box) enters through a coaxial cable 120 and is passed through a coupler 122 to the NVPU 12'. The coupler couples the entire broadband cable signal to the NVPU's channel detection circuitry. This circuitry includes a high pass filter 124 that removes out-of-band signals below channel 2; a first amplifier 126 (50–450 MHz); a mixer 128 (3.25 MHz output); a second amplifier 130; an FM demodulator 132, which outputs an audio signal 133; a third amplifier 134; an audio matching detector 136; a series of 8-bit registers 137; an input 138 for receiving audio from an audio output of a TV; a peak limiter 140; an optional magnetic pickup 142, which can be used instead of the direct audio from the TV; a comparator 144 coupled to the EPROM 145; the DSP controller 146; a synthesizer 148; a voltage controlled oscillator (VCO) 150; a first divider 152; a second divider 154; and a band switch 156.

The VCO 150 generates a signal between 248 MHz and 496 MHz. The mid-band signal between 124 MHz and 248 MHz is generated in the first divider 152 by dividing the VCO signal by 2. The second divider 154 generates a signal between 53.25 MHz and 130 MHz by dividing the mid-band signal. The band switch 156 selects the output of the VCO or one of the dividers and is controlled by the DSP 146. The selected 53.25–453.25 MHz signal is then mixed by the mixer 128 with the incoming audio subcarrier. The output of the mixer is a 3.25 MHz audio subcarrier. The 3.25 MHz audio subcarrier is amplified and demodulated, and the audio baseband is recovered and output on line 133 to the third amplifier 134.

Another audio baseband signal from the television 10 is obtained from an audio cable connected to the television's audio output jack or the magnetic pick-up 142. This audio signal is fed to an amplifier, the peak limiter 140, and then into the audio matching or zero crossing detector 136. The audio baseband signal from the cable, once it has been demodulated from the 3.25 MHz audio subcarrier, is amplified by amplifier 134 and input into the zero crossing detector 136. The two audio baseband signals are compared to determine whether they match.

In this embodiment, the audio baseband signal from the television is fed via line 138 to the peak limiter 140 and then into the zero crossing detector 136. A pulse generator circuit in the zero crossing detector 136 (which detects transitions from positive to negative voltages and vice versa) produces a 25 microsecond pulse for each transition. A similar stream of pulses is generated for the demodulated audio signal from amplifier 134. The two streams of pulses are fed to the pulse comparator 144, which increments a counter each time pulses occur simultaneously. This counter is reset at periodic intervals. A threshold detector in the comparator circuit 144 indicates when the count value is above a preset threshold. If, after a fixed period of time, the threshold detector 144 indicates that the count is above the threshold, a logic HIGH signal is sent to the DSP controller 146 to indicate a match. If the threshold detector indicates a mismatch between the two audio signals, the DSP controller tunes the synthesizer 148 to the next frequency (or channel) and will continue to do so until a match is detected. Specifically, if there is no match, housekeeping logic in the DSP 146 increments a channel counter, resulting in the comparison of the audio signal pick-up from the television with the next channel on the cable. The channel number is used in association with an EPROM 145 look-up table to determine the audio subcarrier frequency being used for that channel. This frequency information is fed back into the synthesizer 148 and the audio subcarrier frequency for the new channel is extracted. The NVPU receives guidance information (e.g., which channels to look at, audio subcarriers, offset frequency) from the series of 8-bit registers 137. Through the same 8-bit registers, the NVPU indicates whether the television set is on or off and if the selected channel matches the channel being viewed.

I claim:

1. A method for determining the channel to which a television is tuned, comprising the steps of:

(a) receiving a television signal receivable by a television and demodulating said television signal to obtain a first audio signal;

(b) obtaining a second audio signal representative of sound generated by said television as a result of being tuned to one of a prescribed set of channels; and (c) generating a match signal on the basis of said first and second audio signals, said match signal indicating whether said first and second audio signals are from the same television channel;

wherein said match signal is generated by an audio transformer; and wherein said first audio signal is fed to one of a primary winding or secondary winding of said transformer, said second audio signal is fed to the other of said primary winding or secondary winding, and said match signal is provided on a center tap of said primary winding.

2. A method for determining the channel to which a television is tuned as recited in claim 1, wherein said first audio signal is phase shifted and rectified prior to being fed to said transformer.

3. A method for determining the channel to which a television is tuned as recited in claim 2, wherein said first audio signal is phase shifted by approximately 90°.

4. A system for determining the channel to which a television is tuned, comprising:

(a) means for receiving a television signal receivable by a television and demodulating said television signal to obtain a first audio signal;

(b) means for obtaining a second audio signal representative of sound generated by said television as a result of being tuned to one of a prescribed set of channel; and (c) means for generating a match signal on the basis of said first and second audio signals, said match signal indicating whether said first and second audio signals are from the same television channel;

wherein said means for generating a match signal comprises an audio transformer; and wherein said first audio signal is fed to one of a primary winding or secondary winding of said transformer, said second audio signal is fed to the other of said primary winding or secondary winding, and said match signal is provided on a center tap of said primary winding.

5. A system for determining the channel to which a television is tuned as recited in claim 4, further comprising a phase shifter, wherein said first audio signal is phase shifted and rectified prior to being fed to said transformer.

6. A system for determining the channel to which a television is tuned as recited in claim 5, wherein said first audio signal is phase shifted by approximately 90°.

* * * * *

UNITED STATES PATENT AND TRADEMARK OFFICE
CERTIFICATE OF CORRECTION

PATENT NO. : 6,085,066
DATED : July 4, 2000
INVENTOR(S) : William T. J. Fong

It is certified that error appears in the above-identified patent and that said Letters Patent is hereby corrected as shown below:

The Abstract was changed from "Disclosed are a method and system performing audio matching" in line 1 to read as follows:
--A system performs audio matching--
In line 1, before "RELATED APPLICATIONS" ADD --CROSS REFERENCE TO--

Column 3,
Line 41, change "depicts is" to --depict--

Signed and Sealed this

Tenth Day of July, 2001

Attest:

NICHOLAS P. GODICI
Attesting Officer
Acting Director of the United States Patent and Trademark Office